United States Patent
MacCormack et al.

(10) Patent No.: US 6,407,855 B1
(45) Date of Patent: Jun. 18, 2002

(54) MULTIPLE WAVELENGTH OPTICAL SOURCES

(75) Inventors: Stuart MacCormack, Mountain View; David M. Giltner; Vincent G. Dominic, both of Fremont; Donald R. Scifres; Bardia Pezeshki, both of San Jose; Edward C. Vail, Menlo Park; Mehrdad Ziari, Pleasanton; Robert G. Waarts, Fremont, all of CA (US)

(73) Assignee: SDL, Inc., San Jose, CA (US)

(*) Notice: Subject to any disclaimer, the term of this patent is extended or adjusted under 35 U.S.C. 154(b) by 0 days.

(21) Appl. No.: 09/430,394

(22) Filed: Oct. 29, 1999

(51) Int. Cl.[7] .................................................. H01S 3/30
(52) U.S. Cl. ........................................... 359/346; 372/6
(58) Field of Search .................................. 372/3, 29.022, 372/98, 92, 94, 95, 96; 359/334, 341, 346

(56) References Cited

U.S. PATENT DOCUMENTS

| | | | | |
|---|---|---|---|---|
| 4,063,106 A | | 12/1977 | Ashkin et al. ................ 359/327 |
| 4,955,025 A | * | 9/1990 | Mears et al. .................... 372/6 |
| 5,323,404 A | * | 6/1994 | Grubb ............................ 372/6 |
| 5,485,481 A | | 1/1996 | Ventrudo et al. ............... 372/6 |
| 5,563,732 A | | 10/1996 | Erdogan et al. ........ 359/341.31 |
| 5,623,508 A | | 4/1997 | Grubb et al. .................... 372/3 |
| 5,715,263 A | | 2/1998 | Ventrudo et al. .............. 372/16 |
| 5,815,518 A | * | 9/1998 | Reed et al. ...................... 372/6 |
| 5,832,011 A | * | 11/1998 | Kashyap ........................ 372/23 |
| 5,838,700 A | * | 11/1998 | Dianov et al. .................. 372/6 |
| 5,844,927 A | | 12/1998 | Kringlebotn |
| 5,878,071 A | | 3/1999 | Delavaux |
| 5,966,480 A | * | 10/1999 | LeGrange et al. ............. 385/27 |
| 5,991,068 A | * | 11/1999 | Massicott et al. ............ 359/337 |
| 5,991,070 A | * | 11/1999 | Zanoni et al. ................ 359/341 |
| 6,020,991 A | * | 2/2000 | Yashinori et al. ............ 359/341 |
| 6,163,552 A | * | 12/2000 | Engelberth et al. ............. 372/3 |
| 6,163,554 A | * | 12/2000 | Chang et al. .................... 372/6 |
| 6,181,465 B1 | * | 1/2001 | Grubb et al. ................. 359/337 |

FOREIGN PATENT DOCUMENTS

EP   0 984 532 A1   3/2000

OTHER PUBLICATIONS

Edited by Ivan P. Kaminow et al.; Optical Fiber Components and Devices; Optical Fiber Telecommunications 111B; pp. 297–317.*

* cited by examiner

Primary Examiner—Thomas H. Tarcza
Assistant Examiner—Deandra M. Hughes
(74) Attorney, Agent, or Firm—Kudirka & Jobse, LLP (57) ABSTRACT

Optical pumping arrangements are provided for the broadband or multiple wavelength pumping of optical sources. Sources may be based on Raman gain media and may use multiple output couplers to couple out different wavelength ranges. Cascaded Raman resonator (CRR) configurations may also be used. Overlapping resonators at different wavelengths may be configured to share gain media, and may have separate portions in separate optical paths. Attenuation filters may also be used that are matched to the gain profile of a gain medium, to flatten the gain spectrum and allow equalization of gain to different output wavelengths. In one embodiment, polarization maintaining fiber is used to develop resonant conditions at different wavelengths in different polarization states. Wideband output gratings may be substituted for narrowband gratings to provide CRR configurations with a broader output band. Broadband amplification may also be provided by using a laser source operating in coherence collapse. The multiple wavelength pumping lends itself to a pumping arrangement in which sources at different wavelengths are combined into separate transmission/gain media such as the different fibers of an optical fiber cable.

42 Claims, 9 Drawing Sheets

MULTIPLE WAVELENGTH OPTICAL SOURCES

FIELD OF THE INVENTION

This invention relates generally to optical gain devices and, more specifically, to multiple wavelength and broadband sources of optical energy.

BACKGROUND OF THE INVENTION

An optical amplifier is a device that increases the amplitude of an input optical signal fed thereto. If the optical signal at the input to such an amplifier is monochromatic, the output will also be monochromatic, with the same frequency. Fiber-based optical amplifiers are an example of devices that require a predetermined optical energy input. One form of optical amplifier known in the art is based on stimulated Raman scattering (SRS), and is referred to generally as a "Raman amplifier." In a Raman amplifier, optical pumping energy is injected into an optical fiber medium through which the signal to be amplified is conducted. The optical pumping energy, via SRS, allows for a transfer of optical power to a wavelength longer than the pumping wavelength, due to the excitation of a vibrational mode in the medium that provides gain at the longer wavelength.

In optical communication media, it is desirable to provide a wide bandwidth to accommodate many channels on the same transmission link. Intrinsic to maintaining such a wide bandwidth is the ability to control signal degradation such that sufficient signal power is maintained in each of the channels. Since optical amplifiers are often used to amplify transmitted signals, such amplification should therefore allow the signal power in each of the channels to be maintained at a relatively equal level. In prior art systems using Raman amplifiers, the effective bandwidth of a system is therefore often limited by the bandwidth of the amplifier itself. Increase of the amplifier bandwidth would allow for an increase in the bandwidth of the communication system, and a corresponding increase in the number of channels available.

SUMMARY OF THE INVENTION

In accordance with the present invention, optical sources and pumping strategies for multiple wavelength or broadband applications. Applications of such sources include the pumping of Raman amplifiers. Such multiple wavelength pumping can be used to modify the gain spectrum of an amplifier and enhance its functionality for a desired application, such as wideband amplification of communication signals.

In one embodiment of the invention, an optical signal generator includes an optical pump source that provides pump energy having a predetermined wavelength range. The optical pump source is coupled into an optical gain medium that responds by producing optical signal energy within an output wavelength range. In a preferred embodiment, the gain medium provides gain via stimulated Raman scattering. Multiple output couplers are provided, each of which couples optical energy in a different wavelength range out of the gain medium. In the preferred embodiment, the output couplers are partially reflective gratings that each has a different wavelength selectivity. The partially reflective gratings are paired with other reflectors to establish multiple wavelength resonance conditions through the gain medium. This results in an output having multiple distinct wavelength peaks.

In a variation of this embodiment, the output couplers are part of a cascaded Raman resonator (CRR) type configuration. The CRR uses sets of gratings that are wavelength selective and that progressively shift resonant wavelengths within the gain medium through several Stokes orders. The output couplers are therefore typically reflective at a wavelength that corresponds to the highest of the Stokes orders of the system. By using multiple output couplers within the wavelength range of the highest Stokes order, an output is generated that has multiple wavelength peaks. In one variation of this embodiment, the output coupler gratings are located in separate parallel optical paths, along with their wavelength matched counterparts. The optical signal from the gain medium corresponding to the next lowest Stokes order is coupled into the parallel paths with a wavelength selective optical coupler. In each of the parallel paths is located a secondary gain medium, such that Raman amplification at the wavelength corresponding to the highest Stokes order occurs in each of the parallel paths. The differently tuned output couplers thus select the different output wavelengths in each of the parallel paths. These output wavelengths may then be combined using another wavelength selective coupler, such as a wavelength division multiplexer (WDM). Alternatively, only some (or none) of the outputs may be combined, allowing them to be delivered to different pumping applications, or to different stages of a multiple stage amplifier.

In a variation of the CRR embodiment, one or more of the CRRs may include a wavelength tunable reflector. The wavelength tunable reflector may be adjusted to reduce the efficiency of one of the resonant cavities established by one of the CRRs, and thereby lower the output power of that CRR. Since the CRRs compete for gain within the gain medium, the power of the other CRRs will correspondingly increase. This allows the relative output power at the different output wavelengths to be adjusted. If two tunable reflectors are used with more than one of the CRRs, the relative output power between the CRRs may be adjusted over a wider range. Although the preferred embodiment makes use of two CRRs, more than two may also be used.

In another embodiment of the invention, overlapping resonant cavities are used for which separate output couplers are used for each cavity. A shared primary gain medium is located in a common optical path, and each cavity also has its own separate gain medium, through which optical energy in the other cavity does not pass. In one version of this embodiment, portions of the separate cavities are located in separate optical paths. Wavelength selective couplers are used to couple the different wavelengths corresponding to the different resonant cavities between the separate optical paths. Output couplers for the different wavelengths are located in the separate optical paths, and are preferably partially reflective gratings. Highly reflective gratings for the output wavelengths are located in the common optical path or, in the preferred embodiment, a single highly reflective grating is used in the common optical path that is reflective at the different wavelengths, such as a broadband grating that encompasses the wavelength range of each of the output wavelengths. In an alternative embodiment, the reflectors used in the parallel paths are highly reflective, and the grating or gratings used in the common optical path are partially reflective. Thus, the outputs are coupled out of the common optical path, and a wavelength selective coupler may be used to separate the output wavelengths from other optical energy in the common optical path.

In yet another embodiment of the invention, a gain medium is used that has a known gain profile when pumped by a particular pump source. Along with the resonator reflectors is provided a filter located within the resonant cavity established by the reflectors, that selectively attenuates wavelengths within the gain spectrum. In the preferred embodiment, the attenuation is matched to known variations in the gain profile such that gain maxima are reduced and the overall gain profile is flattened. In an extension of this embodiment, the gain medium is pumped and multiple output couplers are used to output optical energy in multiple output wavelength ranges. Because of the gain flattening provided by the filter, the gain produced in each of the output wavelength ranges is approximately the same.

In still another embodiment of the invention, a source is provided with a CRR configuration, including multiple reflector pairs at wavelengths corresponding to the different Stokes orders of the CRR. The source also includes a gain medium and resonant cavity reflectors, including multiple output couplers each of which selects and outputs a different wavelength within an output wavelength band. In this embodiment, however, the reflectors at the highest of the Stokes orders, which preferably include a partially reflective output coupler reflector, have a broad wavelength selection band, such that the optical energy output from the source extends across a relatively wide bandwidth range. Thus the source is advantageous for applications such as the broadband pumping of a Raman amplifier.

In a different embodiment of the invention, a multiple output wavelength source is provided that uses polarization maintaining (PM) fiber as a Raman gain medium. Cavity reflectors are integrated into the PM fiber, one of which is preferably a partially reflective output coupler. The PM fiber gain medium is then pumped, and two resonant conditions develop, respectively, at two orthogonal polarizations within the fiber. Each of these resonant signals develops at a different wavelength due to the birefringence of the fiber, and by coupling them out of the gain medium, a multiple wavelength output is provided. Preferably, the PM fiber has a relatively high birefringence.

In another embodiment of the invention, broadband pumping for a Raman amplifier is provided by the use of a laser source operating in coherence collapse. The source uses an optical gain element, such as a semiconductor gain chip, a Fabry-Perot diode or a flare diode. The output from the gain element is coupled into a transmission medium, such as an optical fiber, along which is positioned a low level reflector. In the preferred embodiment, the low level reflector is a grating written into the transmission fiber, and has a reflectivity of less than 10%. Moreover, the grating is positioned a relatively large distance from a reflector adjacent the gain medium, e.g., greater than 20 cm, and ensures broadband operation of the source.

A multiple wavelength pumping arrangement is also provided herein for multiple separate optical paths, such as the separate transmission fibers of an optical fiber cable. In accordance with this embodiment, multiple pump sources are used, each having a different output wavelength. Outputs from the different pump sources are combined into each of the different fibers, such that each fiber acquires pumping energy from each of the sources. In this way, broadband pumping energy is provided equally to each of a number of related amplification media.

BRIEF DESCRIPTION OF THE DRAWINGS

The above and further advantages of the invention may be better understood by referring to the following description in conjunction with the accompanying drawings in which.

DETAILED DESCRIPTION

Figure 1:
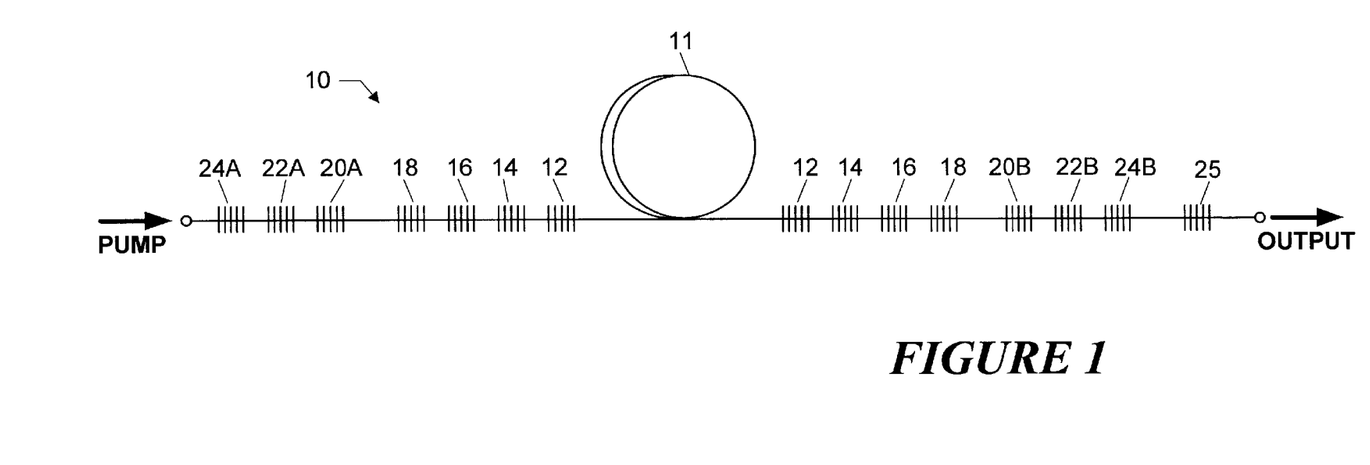
FIG. 1 is a schematic view of a multiple output wavelength optical source according to a preferred embodiment of the invention.

Shown in FIG. 1 is a broadband optical source 10 according to the present invention. The output of this source provides power in a number of different wavelength bands, and is useful for applications such as the pumping of a Raman amplifier. Use of such a source with a Raman amplifier provides amplifier gain over a wider wavelength range, and allows the amplifier to operate with a relatively wide gain profile. This, in turn, allows the amplification of a wider wavelength range of optical signals, and therefore accommodates relatively high bandwidth optical communications systems.

The optical source 10 includes an inner amplifier configuration that is similar to a "cascaded Raman resonator" (CRR). The CRR is known in the art, and uses a Raman amplification medium that is surrounded on both sides by matched pairs of wavelength selective reflectors. Each of the reflector pairs is tuned to a wavelength corresponding to one of the Stokes orders relative to the original pumping wavelength. For example, stimulated Raman scattering (SRS) results in optical energy at the original pumping wavelength being converted to optical energy at a higher wavelength corresponding to the first Stokes order relative to the original wavelength. Reflectors are provided that resonate the optical energy of the first Stokes order, and further SRS causes the generation of optical energy at a second Stokes order. A second set of reflectors is tuned to the wavelength of this second Stokes order, and the process continues.

In the embodiment of FIG. 1, optical fiber 11 is used as a Raman gain medium. In the exemplary embodiment, the fiber is single-mode, small core area fiber with a high content of germanium or phosphorus, although other optical fiber may also be used. Pump energy at an initial wavelength is introduced to one side of the Raman gain medium, as shown. In the preferred embodiment, the initial wavelength is 1117 nm. As the pump light propagates through the Raman gain medium 11, SRS gain is produced at the first Stokes order. Grating 25 is reflective at 1117 nm and redirects any pump light that passes all the way through the gain medium back into the gain medium. Gratings 12 are both tuned to 1175 nm, which is within the wavelength range of the first Stokes order, and oscillate light at this wavelength through the gain medium 11.

The gratings in this embodiment are preferably Bragg gratings written directly into the fiber, as is known in the art. The 1175 nm light causes SRS gain in the Raman gain medium 11 at the second Stokes order. Gratings 14 are tuned to 1240 nm, within the wavelength range of this second order, and keep light at that wavelength oscillating in the gain medium 11, allowing further SRS gain at the third Stokes order. Gratings 16 are tuned to 1311 nm, which is within the wavelength range of the third Stokes order, and maintain the light at this wavelength in the fiber, allowing SRS gain at the fourth Stokes order. Finally, gratings 18 are tuned to 1391 nm, which is within the wavelength range of the fourth Stokes order, and keep it oscillating in the gain medium 11 as well. This induces SRS at the fifth Stokes order.

The combination of the fiber gain medium 11 and gratings 12, 14, 16 and 18 provide output signal light at a band of wavelengths corresponding to the fifth stokes order. Given the selection of the 1391 nm wavelength by gratings 18, this fifth stokes band ranges from about 1467 nm to about 1489 nm full-width, half-maximum (FWHM). In prior art CRRs, one narrow wavelength band would be selected from this range. However, in this embodiment a multiple wavelength output is provided. This is accomplished by the use of additional grating pairs. Gratings 20A, 22A and 24A are highly reflective gratings having center wavelengths within the wavelength range of the fifth Stokes order. In the preferred embodiment, the center wavelengths of these gratings are, respectively, 1475 nm, 1480 nm and 1485 nm. To the other side of the gain medium are gratings 20B, 22B and 24B, which are also tuned, respectively, to 1475 nm, 1480 nm and 1485 nm. However, unlike gratings 20A, 22A and 24A, gratings 20B, 22B and 24B are only partially reflective, and act as output couplers to allow optical power in the selected wavelength bands to be output as shown. Thus, the overall system, of FIG. 1 operates as a multiple wavelength band optical source.

Figure 1A:
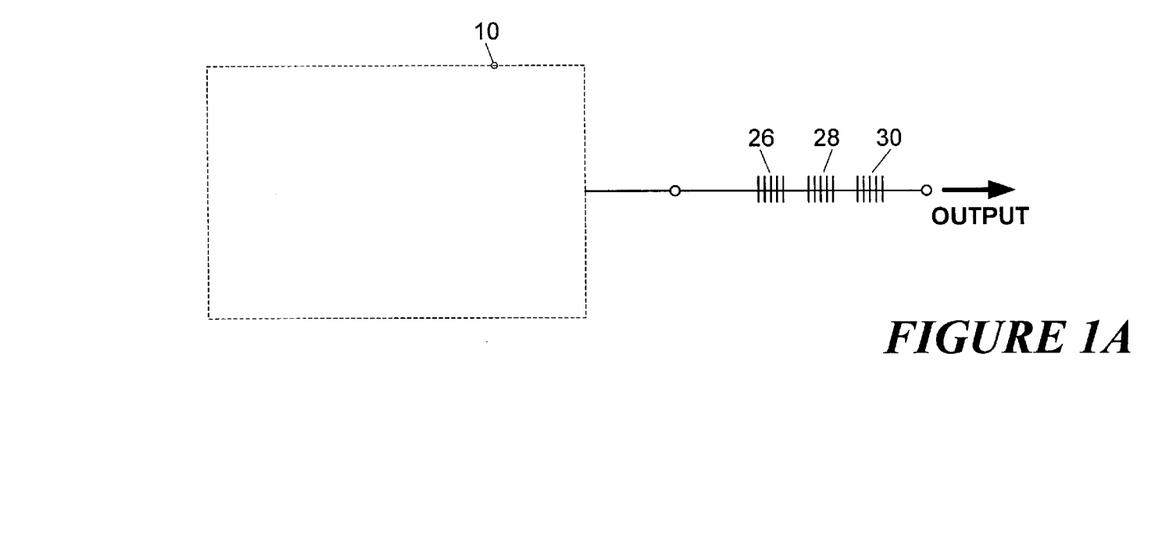
FIG. 1A is a schematic view of an embodiment that is similar to that of FIG. 1, but which uses several long period gratings used to modify an overall gain profile of the source.

The embodiment of FIG. 1A is an extension of the embodiment of FIG. 1. Element 10 of FIG. 1A is representative of the source depicted in FIG. 1. As shown, at the output of the device is added three additional gratings 26, 28, 30. These additional gratings are long-period gratings, and are constructed to be centered on the same wavelengths as gratings 20B, 22B and 24B, respectively. The long-period gratings 26, 28, 30 function as loss elements at each of the different wavelengths by refracting some of the optical energy at the wavelength in question out of the core of the fiber. In the embodiment of FIG. 1A, the gratings provide a means by which to control the relative output power at each of the output wavelengths, and therefore give the system a flatter overall gain profile. For example, if the power output via the gratings 20B, 22B, 24B was such that gain in the 1485 nm band was much higher than in the other two, the grating corresponding to that wavelength (i.e., grating 28) could be provided with a higher degree of loss than the other two, resulting in a more equal distribution of power among the wavelengths.

Figure 2:
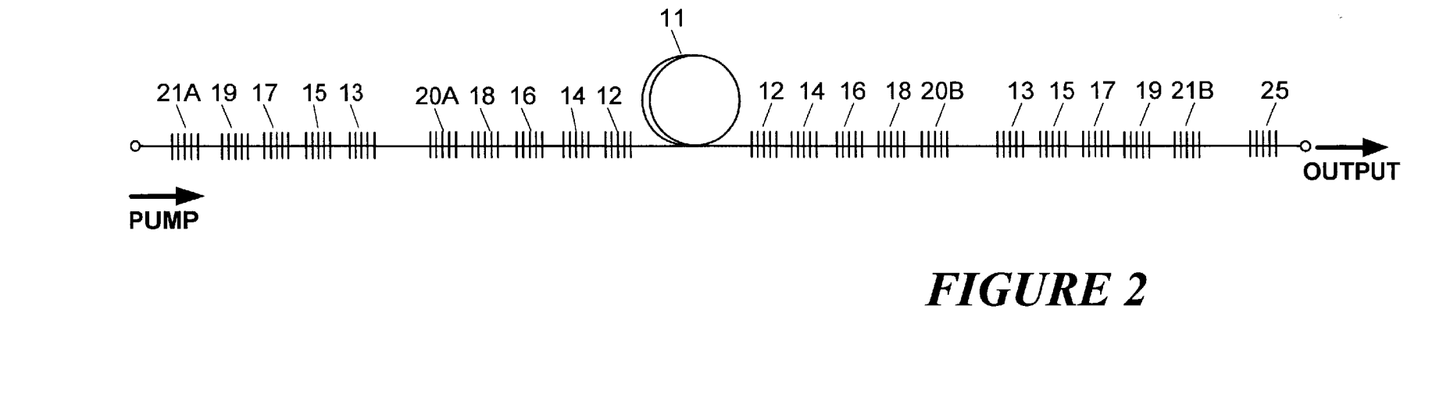
FIG. 2 is a schematic view of an embodiment that is similar to that of FIG. 1, but for which multiple sets of reflectors are used for more than one Stokes order of the CRR configuration.

The embodiment of FIG. 2 is similar to that of FIG. 1, but differs in that multiple grating pairs are provided for each of the Stokes orders, not just the highest order. A gain element 11 like that of FIG. 1 is used in this embodiment, as are gratings 12, 14, 16, 18, 20A and 20B. These gratings establish a CRR with Stokes order reflectors centered at 1175 nm, 1240 nm, 1311 nm, 1391 nm and 1480 nm. As in FIG. 1, the 1480 nm reflector pair includes highly reflective grating 20A and partially reflective output coupler grating 20B. Grating 25 is also provided as in the embodiment of FIG. 1, to redirect any pump light that passes all the way through the gain medium back into the gain medium. Thus, with this first CRR structure, a portion of the output from the source is centered about 1480 nm. However, a second set of CRR gratings is also provided.

In the embodiment of FIG. 2, a second set of gratings 13, 15, 17, 19, 21A and 21B are similar to the first set of gratings 12, 14, 16, 18, 20A and 20B, but differ slightly in their respective wavelength selectivity. Since the gain bandwidth of the Raman gain medium is roughly 30 nm for each SRS conversion, reflectors for each of the Stokes order may be centered about different wavelengths within that gain bandwidth. Thus, while gratings 12 are centered about 1175 nm, gratings 13 may be centered about 1165 nm, and still develop a resonant condition for energy generated by the SRS conversion of the pump energy. This resonance then, in turn, causes the generation of optical energy within a bandwidth that is shifted 10 nm relative to the optical energy generated by the light resonated between the gratings 12.

The shifted second Stokes bandwidth order caused by the selectivity of the gratings 13 allows the gratings 15 to be configured to provide an additional shift relative to the first set of gratings. That is, while grating pair 14 is tuned to a wavelength of 1240 nm, grating pair 15 is centered about a wavelength of 1220 nm, which is well within the shifted gain bandwidth, but is 20 nm apart from the resonant wavelength for the same Stokes order of the first set of gratings. Similarly, gratings 17 are constructed to be 30 nm shorter in wavelength than gratings 16 (i.e., 1281 nm), gratings 19 are constructed to be 40 nm shorter in wavelength than gratings 18 (i.e., 1351 nm) and gratings 21A and 21B are constructed to be 50 nm shorter in wavelength than gratings 20A and 20B (i.e., 1430 nm). Thus, the source of FIG. 2 will have an output with multiple wavelength peaks centered about 1480 nm and 1430 nm, respectively.

Although the embodiment of FIG. 2 provides an exemplary embodiment of a multiple wavelength output device having two sets of differing CRR gratings, the gratings may also be tailored to produce a desired output. For example, the two grating sets may be selected such that they are equally spaced in wavelength about the peak wavelength for the gain bandwidth of the Stokes order in question. For example, given an input pumping wavelength of 1117 nm, as described above, the center of the gain bandwidth for a typical Raman amplifier will be roughly 1175 nm. It may therefore be desirable to have gratings 12 and 13 tuned, respectively, to 1170 nm and 1180 nm, rather than to 1175 nm and 1165 nm. In this way, the gain at each of the selected wavelengths should be about equal.

Another example of how this embodiment might be implemented recognizes that the source may be useful for pumping a Raman amplifier. Since a Raman amplifier has gain bandwidth of roughly 30 nm, it may be desirable to produce to wavelength peaks in the output spectrum of the source that are separated by 30 nm, so as to produce a wide, relatively flat gain profile. The final separation between the output wavelength peaks depends on the amount of relative wavelength shift between the gratings setting up the resonant conditions for the different Stokes orders. Moreover, since the wavelength steps from one Stokes order to the next change with each step (i.e., get longer with wavelength), it may be desirable to make the shift between the grating pairs for a different shift be relative to a percentage of the overall Stokes shift, rather than a fixed amount, such as the 10 nm shift used in the embodiment described above. Those skilled in the art will also recognize that it is not necessary to use five shifts to achieve the separate wavelength peaks. Any desired number of shifts will do. Also, more than two sets of gratings may be used to provide more than two peaks, if so desired.

In a variation of the embodiment of FIG. 2, one of the gratings for one of the grating sets may be made adjustable to allow the efficiency of that resonant cavity to be modified. In the preferred embodiment, this grating would be one of the reflectors for the highest resonated Stokes order for one of the grating sets, although other gratings might be used instead. For example, grating 20A or 20B may be made adjustable in wavelength selection so that it may be tuned to be slightly "off resonance." Since the two CRR structures of FIG. 2 overlap the same gain medium, they compete for optical power. Having a tunable grating within one of the grating sets allows the efficiency of that CRR to be reduced, which correspondingly decreases the power output by that CRR and increases the power output by the other. In yet another embodiment, one of the gratings from each of the CRR structures can be made tunable, for example gratings 20A and 21A. Such a configuration allows the output power to be shifted from one CRR to the other, or vice versa, whereas the use of a single tunable grating only allows a power shift away from one CRR and not the other.

Figure 3:
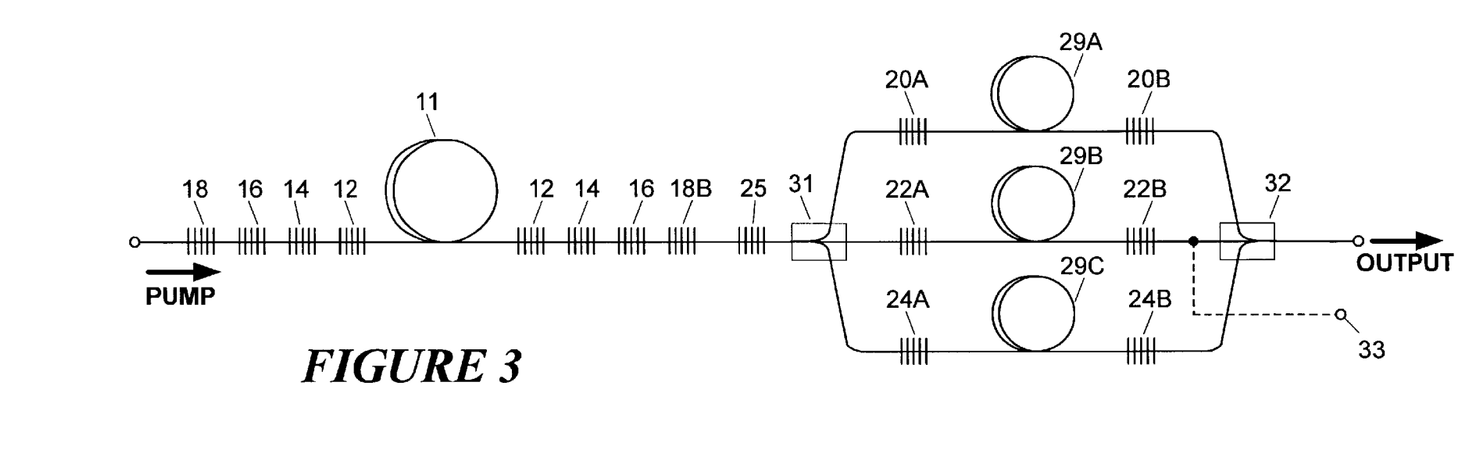
FIG. 3 is a schematic view of an embodiment in which a multiple output wavelength device has pairs of output gratings for a CRR that are located in parallel paths.

Shown in FIG. 3 is another alternative embodiment to that shown in FIG. 1. In this embodiment, the Raman fiber gain medium 11 and the gratings 12, 14, 16, 18 are the same as in the embodiment of FIG. 1. Likewise, grating 25 is used to reflect optical energy at the pump wavelength. However, in this case, grating 18B, which is a partially reflective output coupler, is used in place of a highly reflective grating. Moreover, the gratings 20A, 20B, 22A, 22B, 24A, 24B, rather than being positioned to either side of the gain medium, are all positioned to its output side. In this case, the grating pairs are located in different parallel branches. Each of these branches includes a secondary Raman gain medium 29A, 29B, 29C, and each constitutes a separate resonator. For example, if the center wavelengths of the grating pairs 20A, 20B, 22A, 22B, and 24A, 24B correspond, respectively, to 1475 nm, 1480 nm and 1485 nm, the upper branch (in the orientation shown in FIG. 3) functions as a resonator with an output wavelength of 1480 nm, the middle branch functions as a resonator with an output wavelength of 1485 nm, and the lower branch functions as a resonator with an output wavelength of 1490 nm.

The output coupling grating 18B passes enough optical energy in the wavelength range of its respective Stokes order (e.g., approximately 1391 nm) that Raman amplification develops at the next Stokes order in each of the gain media 29A, 29B, 29C. The output from the gain medium 11 is distributed to the three parallel branches via a three-to-one fiber optic splitter 31. The outputs from the three branches are recombined using narrowband wavelength division multiplexer (WDM) 32. The embodiment of FIG. 3 differs somewhat from the embodiment of FIG. 1 in that it requires additional components in the form of splitter 31 and WDM 32. However, the resonant cavities developed between the different grating pairs 20A, 20B, 22A, 22B, 24A, 24B typically have closely spaced wavelengths. By using the separate parallel paths for these cavities, interaction between them is minimized.

In an alternative version of this embodiment, only the outputs from the resonators containing gain media 29B and 29C are recombined by WDM 32, while the output from the resonator containing gain medium 29A is taken separately via output port 33, shown in broken lines in the figure. In this version, the two outputs may be used for pumping separate amplifiers or separate stages of a multiple stage amplifier. For example, an output from port 33 at a wavelength of 1480 nm would be appropriate for pumping an erbium doped fiber amplifier, while the combined output of the other two branches could be used to pump a Raman amplifier. If both amplifiers were used for the same signal, a relatively wide overall gain bandwidth could be created for the signal being amplified.

Figure 4:
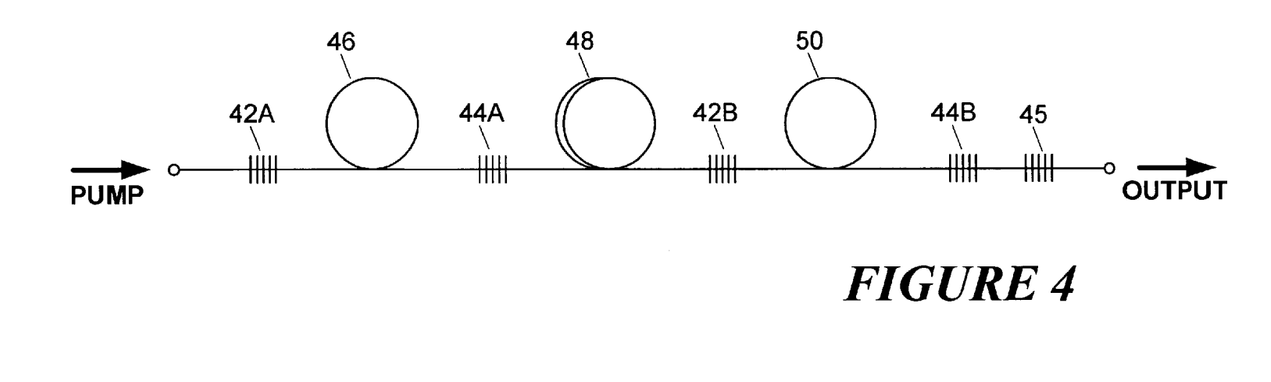
FIG. 4 is a schematic view of an embodiment in which a multiple wavelength output is obtained using overlapping resonant cavities.

In another embodiment, a multiple wavelength source is provided as depicted in FIG. 4. In this embodiment, three gain media 46, 48, 50 are pumped by two resonator cavities formed, respectively, by the matched pair of gratings 42A, 42B and the matched pair of gratings 44A, 44B. Gratings 42A, 42B are both selectively reflective at (i.e., "tuned to") a first wavelength, such as 1475 nm. Meanwhile, gratings 44A, 44B are both tuned to a second wavelength, such as 1485 nm. Gratings 42A and 44A are both highly reflective, while gratings 42B and 44B are partially reflective so as to function as output couplers. As shown, the resonant cavities formed by these grating pairs overlap with each other, so that gain medium 46 generates light at the first wavelength, gain medium 50 generates light at the second wavelength, and gain medium 48 generates light at both the first and the second wavelengths. Grating 45 is reflective at the pump wavelength, which may be, e.g., 1391 nm.

The result of the arrangement of FIG. 4 is a dual wavelength output that is useful for a variety of purposes, including the pumping of a Raman amplifier. The ratio of the fiber lengths between the different sets of gratings determines the overlap between the two resonators, and can be adjusted to minimize threshold while maximizing dual wavelength output. If the gratings overlap too much, the device will tend to resonate only at the wavelength with the highest gain. On the other hand, if there is not enough overlap between the two, the total fiber length is increased and greater power will be required to excite the entire fiber length.

Figure 5:
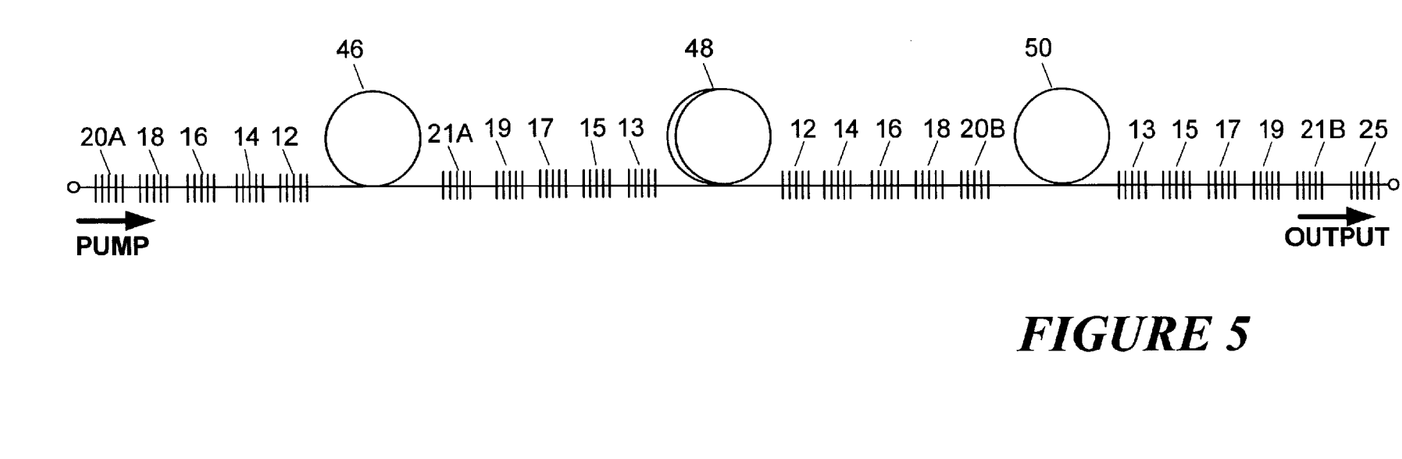
FIG. 5 is a schematic view of an embodiment similar to that of FIG. 4, but in which the overlapping cavities include the cavities for two CRR configurations.

An embodiment similar to that of FIG. 4 is shown in FIG. 5. Multiple gain media 46, 48, 50 are separated from one another, and are positioned such that multiple resonant cavities overlap. However, in this embodiment, the overlapping is between two CRR type configurations. As in the embodiment of FIG. 2, the system uses two sets of gratings, each of which provides a progressive shift of wavelengths through a number of Stokes orders. To illustrate this point, the same gratings are shown in FIG. 5 as are used in the embodiment of FIG. 2, albeit in different relative positions.

As shown in the figure, the grating set 12, 14, 16, 18, 20A and 20B provides for CRR resonance through gain media 46 and 48. Meanwhile, grating set 13, 15, 17, 19, 21A and 21B provides for CRR resonance through gain media 48 and 50. Thus, the advantages of overlapping cavities are provided along with the multiple wavelength selection flexibility of the FIG. 2 embodiment. This results in a highly versatile configuration in which an output may be provided that has multiple wavelength peaks the selection of which may be efficiently controlled. Moreover, all of the variations of the FIG. 2 and FIG. 5 embodiments (e.g., number of grating sets, wavelength differences between grating sets, length of gain media, reflectivity of gratings, etc.) may also be applied to this embodiment to customize it for desired performance. As in previous embodiments, grating 25 is used to reflect pump energy back into the gain media.

Figure 6:
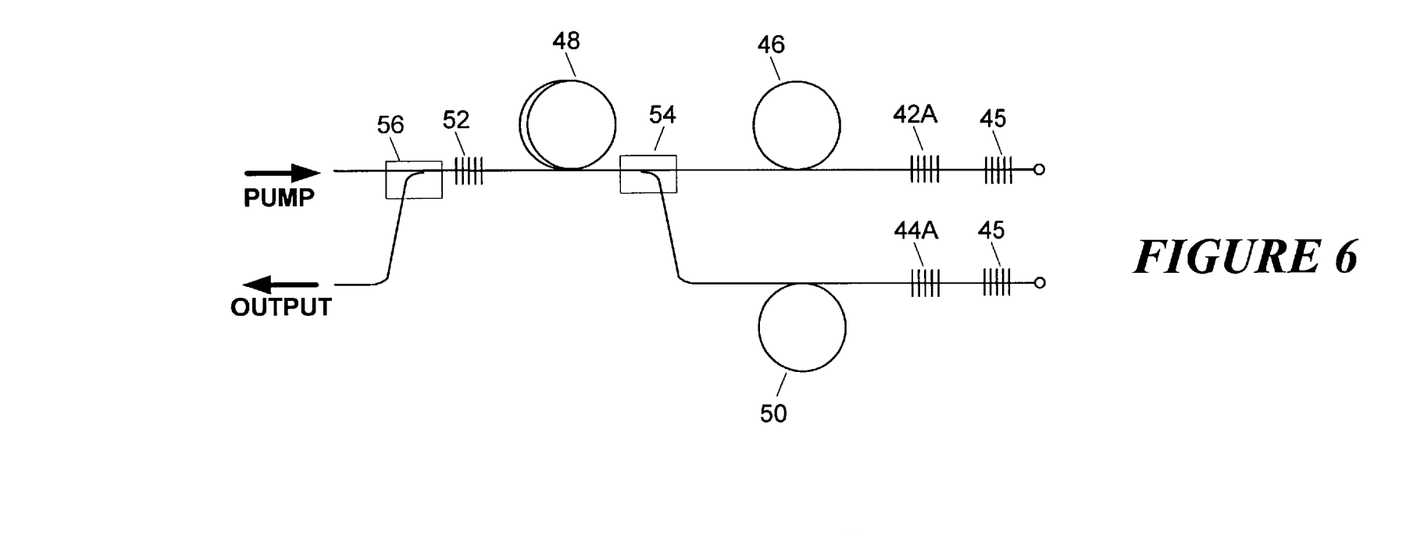
FIG. 6 is a schematic view of a variation of the embodiment of FIG. 4 in which the overlapping cavities are expanded into parallel branches.

A different variation on the embodiment of FIG. 5 is shown in FIG. 6. In this embodiment, overlapping cavities are again used, but the single-wavelength cavities reside in parallel resonator branches. As shown, gain medium 46 and highly reflective grating 42A are located in a first branch that is parallel to a branch that contains gain medium 50 and highly reflective grating 44A. Both resonator wavelengths propagate through gain medium 48, and are separated by WDM 54, which couples them into and out of the separate parallel paths. A single, partially reflective grating 52 is reflective at both the first and the second wavelengths, and serves as an output coupler for the source. When the first and second wavelengths are output, they are directed away from the input path of the pump energy by WDM 56. This embodiment makes use of two pump reflectors 45 to contain the pump energy (e.g., at 1391 nm) within the gain media.

Figure 7:
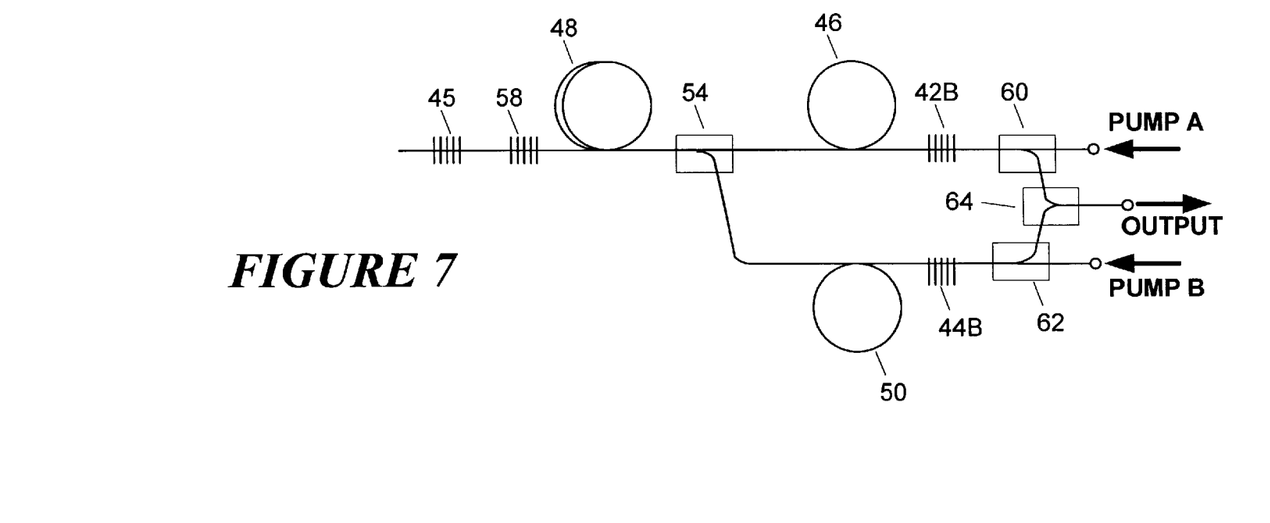
FIG. 7 is a schematic view of an embodiment similar to that of FIG. 6, but in which pumping is in a different direction, and the output taken is taken from the opposite side.

Another embodiment similar to that of FIG. 6 is shown in FIG. 7. In this embodiment, the gain media 46, 48, 50 are located in the same relative positions. However, in each of the parallel branches, a partially reflective output grating 42B, 44B is used as an output coupler. Accordingly, a highly reflective grating 58 is used as the other reflective component for both resonator wavelengths, and is reflective at both resonator wavelengths, and may be reflective across a broad band that includes both wavelengths. In this configuration, a first pump wavelength ("pump A") is injected via one of the parallel branches, while the other pump wavelength ("pump B") is injected through the other. These two pumping wavelengths provide the SRS gain at each of the two wavelengths that resonate in the cavities formed, respectively, by gratings 58, 42B and 58, 44B. In another variation, the output of the source is taken from the parallel paths. The output signals are coupled away from the input pump paths via WDMs 60 and 62. These signals are subsequently combined into a multiple wavelength output by WDM 64.

Figure 8:
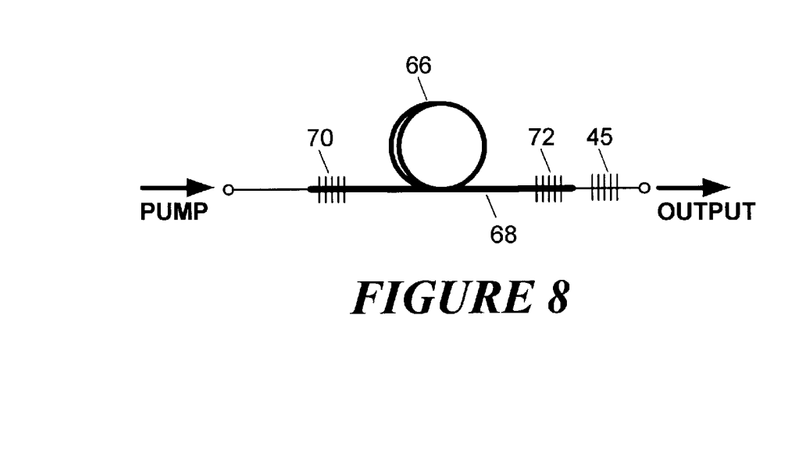
FIG. 8 is a schematic view of an embodiment of the invention in which two different polarization states are used to provided two separate output wavelengths.

FIG. 8 shows another embodiment of the present invention in which two different polarization states are used to provide two separate output wavelengths. In this embodiment, an optical source is formed using a SRS gain medium 66 constructed from polarization maintaining (PM) optical fiber 68. A highly reflective grating 70 and a partially reflective grating 72 are written into the PM fiber, and function as the ends of a cavity resonator. The partially reflective grating 72 serves as an output coupler for the optical source. The grating 45 serves to reflect pump energy (at e.g., 1391 nm) back into the gain medium 66.

The use of PM fiber for the resonator and the gratings in the FIG. 8 embodiment results in the birefringence of the fiber causing reflectivity of the PM grating to occur at a different wavelength for each polarization. This, in effect, sets up two resonators in the same cavity. The orthogonal nature of the two polarization modes causes lasing at both wavelengths, as Raman amplification is highly polarization dependent. A limitation may exist in the maximum obtainable wavelength spacing between the two polarizations, which depends on the maximum birefringence of the fiber. If the birefringence is too large, the fiber may be hard to splice into standard single mode fiber and have high loss.

Figure 9:
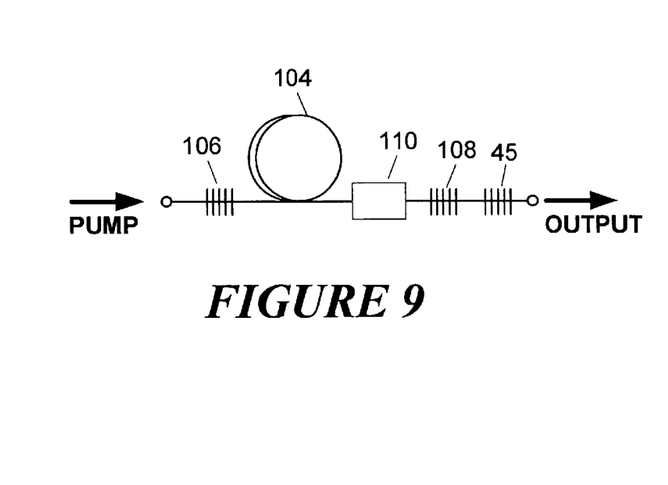
FIG. 9 is a schematic view of a system in which a loss element is matched to a gain profile of a Raman gain medium to flatten an overall gain profile.

FIG. 9 shows an embodiment of the present invention in which a loss element 110 is used with a Raman gain medium to provide an optical source with a relatively flat gain profile. Raman gain medium 104 is pumped by optical energy at a pumping wavelength. The gain medium 104 is preferably a length of single mode fiber, typically several hundred meters long, that is optimized for high Raman gain. The generated Raman gain at the output wavelength resonates between highly reflective grating 106 and partially reflective output coupler grating 108. Located within the Raman resonator cavity is loss element (or "filter") 110, which in the preferred embodiment is a long period grating or a multilayer dichroic filter. The filter has a loss characteristic that matches the variations in the gain characteristic from wavelength to wavelength. That is, the filter has loss peaks that match the gain peak of the Raman gain medium, so that the filter tends to flatten the overall spectral response of the gain medium. As in previous embodiments, grating 45 is provided to contain pump light within the gain medium 104.

Figure 10A:
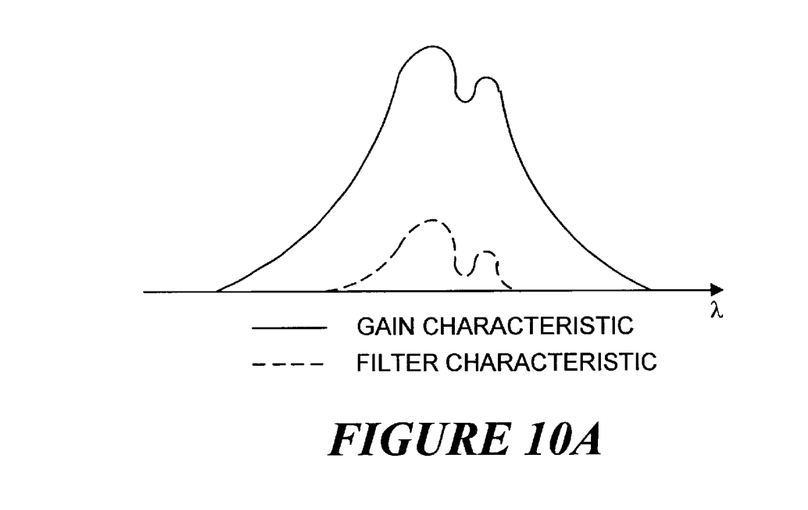
FIGS. 10A and 10B, respectively, are graphical views of the gain medium/filter wavelength responses and the overall response of the filtered gain medium of FIG. 9.
Figure 10B:
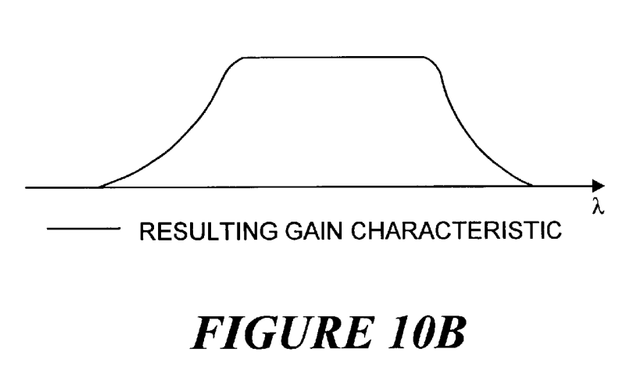

FIGS. 10A and 10B depict, respectively, the gain medium/filter wavelength responses and the overall response of the filtered gain medium. As shown in FIG. 10A, the wavelength response of the filter matches the peaks and valleys of the wavelength response of the gain medium, thereby attenuating the optical signal more at wavelengths for which a higher gain is provided by the gain medium. The resulting gain response for the system is depicted in FIG. 10B. As shown, the overall gain of the system is reduced, but the gain profile is significantly flatter, thereby providing more evenly distributed amplification across the system wavelength band. Thus, a source may be created by using wavelength selective elements to select multiple wavelengths or a broadband output within the flattened gain spectrum, and the gain provided by the gain medium 104 will be the same within each of the selected wavelength bands. An example of this is shown in FIG. 11.

Figure 11:
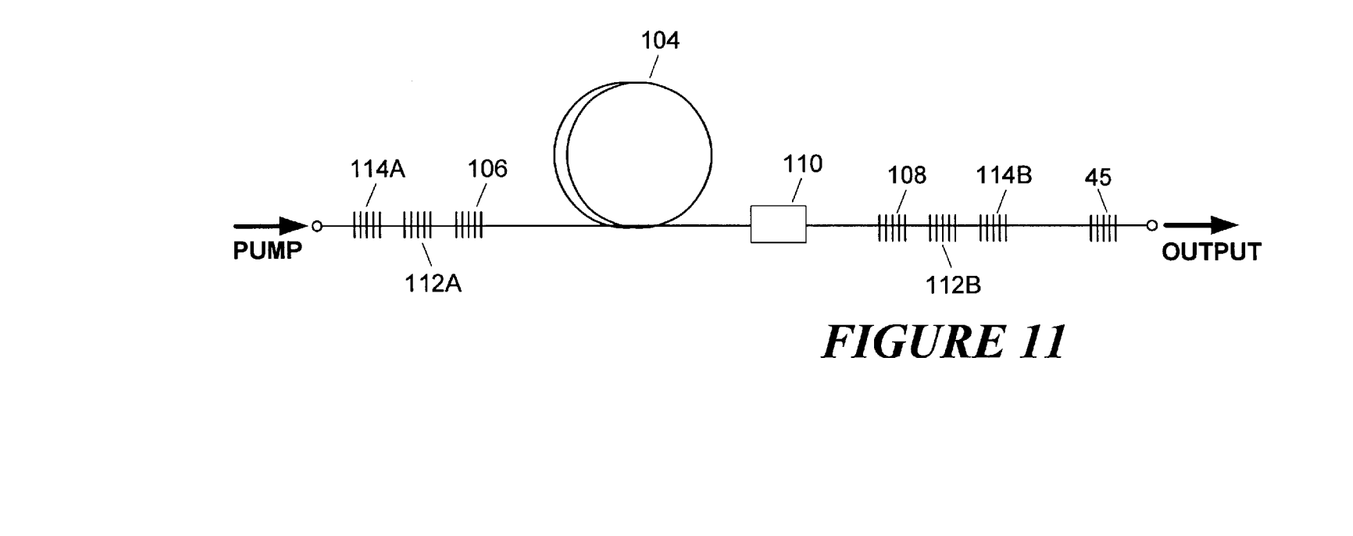
FIG. 11 is a schematic view of a modification of the FIG. 9 embodiment in which multiple, narrowband wavelengths are generated with the flat-gain profile medium.

The embodiment of FIG. 11 makes use of the configuration shown in FIG. 9, including gain medium 104, filter 110 and gratings 106, 108. In addition, two grating pairs 112A, 112B and 114A, 114B are used to select two desired output wavelengths that may be used for any desired purpose, such as the pumping of a Raman amplifier. Because of the gain flattening of the source, the two output wavelengths should acquire the same gain from the gain medium 104. Thus, if the input powers are the same for both, the output of the source should have the same power in each of the wavelength bands. Although this example involves the use of only two narrow wavelength bands, those skilled in the art will recognize that additional gratings may be used to provide additional output wavelengths. Moreover, wide band reflectors may be used to provide a wider output band for each selected output. One example might take advantage of the gain bandwidth of a subsequent device, such as a Raman amplifier. By careful selection of the wavelength separation between narrowband outputs from the device of FIG. 11, pumping of a subsequent Raman amplifier can produce an overlap of the gain bands produced in the subsequent amplifier such that it has a relatively flat overall gain profile.

Figure 12:
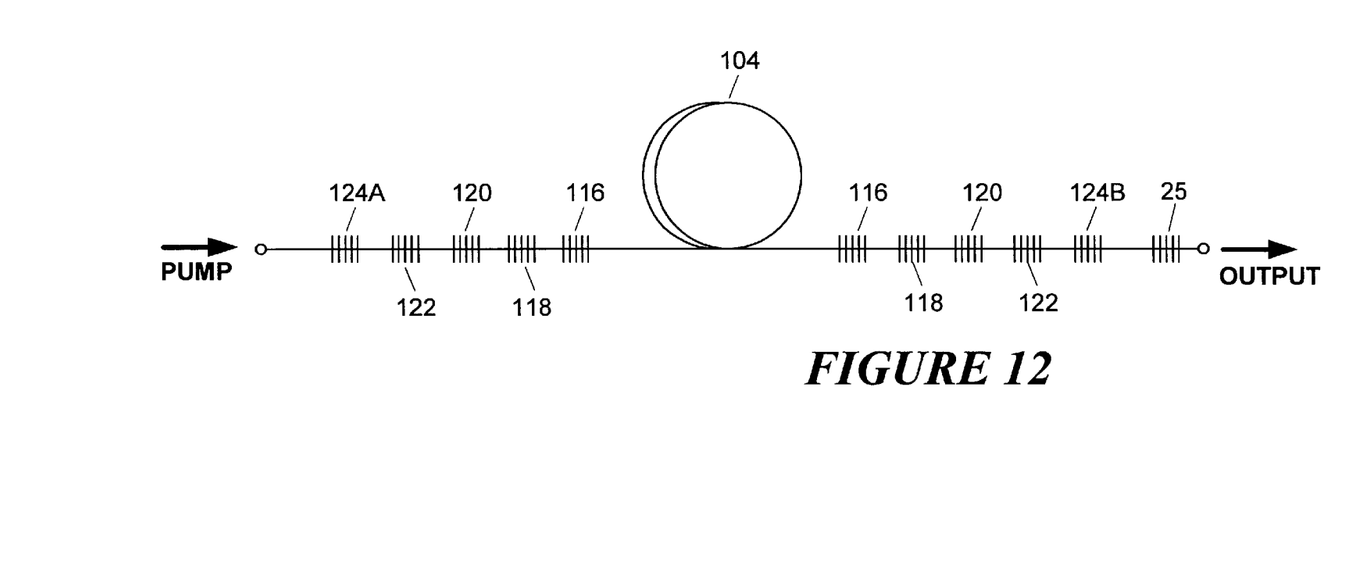
FIG. 12 is a schematic view of an embodiment of a CRR in which wide wavelength band reflectors are used to provide a wide band output.

In FIG. 12 is shown another embodiment in which a CRR arrangement is used. Gratings 116, 118, 120, 122 are highly reflective gratings surrounding Raman gain medium 104, and form reflective pairs for each of the first four Stokes orders relative to the wavelength of the input pump energy. Gratings 124A and 124B, respectively, are highly reflective and partially reflective gratings in the wavelength range of the fifth Stokes order, and grating 124B therefore functions as an output coupler. However, unlike prior art CRRs, the gratings 124A and 124B each have a broad reflection band, such that the output of the source is spread over a relatively wide wavelength range. For example, these gratings may have a wavelength selectivity 1–2 nm wide. This allows the device as a whole to have a broader output wavelength band. Moreover, the broad output band lowers the stimulated Brillouin scattering (SBS) threshold of the device, making it less susceptible to SBS. In one variation of this embodiment, more than one pair of gratings, and as many as all of them, has a wide wavelength selectivity. This spreads out the pumping bands for each of the Stokes orders, and even further broadens the output band of the source. Notably, a CRR structure is not necessary to gain the advantages of a wide band selectivity reflector, and other amplifier structures may benefit from it as well. Grating 25 is highly reflective to wavelengths within the pump wavelength range and helps to contain the pump energy within the gain medium 104.

Figure 13:
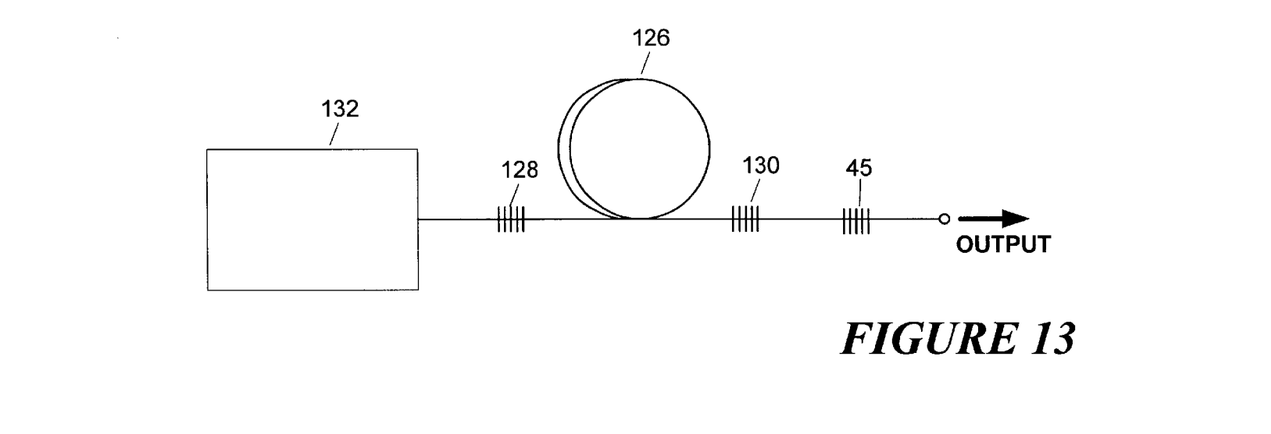
FIG. 13 is a schematic view of a pumped Raman gain medium in which the source of the pumping energy operates in a coherence collapse mode.

In FIG. 13 is shown a Raman amplifier including Raman gain medium 126 and gratings 128 and 130, each of which are tuned to a desired output wavelength of the amplifier. The grating 128 is highly reflective, and the grating 130 is partially reflective, such that it operates as an output coupler. The gain medium is pumped by a discrete broadband source 132 that operates in a coherence collapse mode. Grating 45 is reflective for wavelengths in the pump wavelength band, and redirects any pump energy passing through the gain medium 126 back into the gain medium. The coherence collapse source is particularly suited to the pumping of the Raman gain medium in that it has a broad output linewidth, and minimizes SBS problems. Several possible embodiments of this coherence collapse source are described below, although others may also be used.

Figure 14:
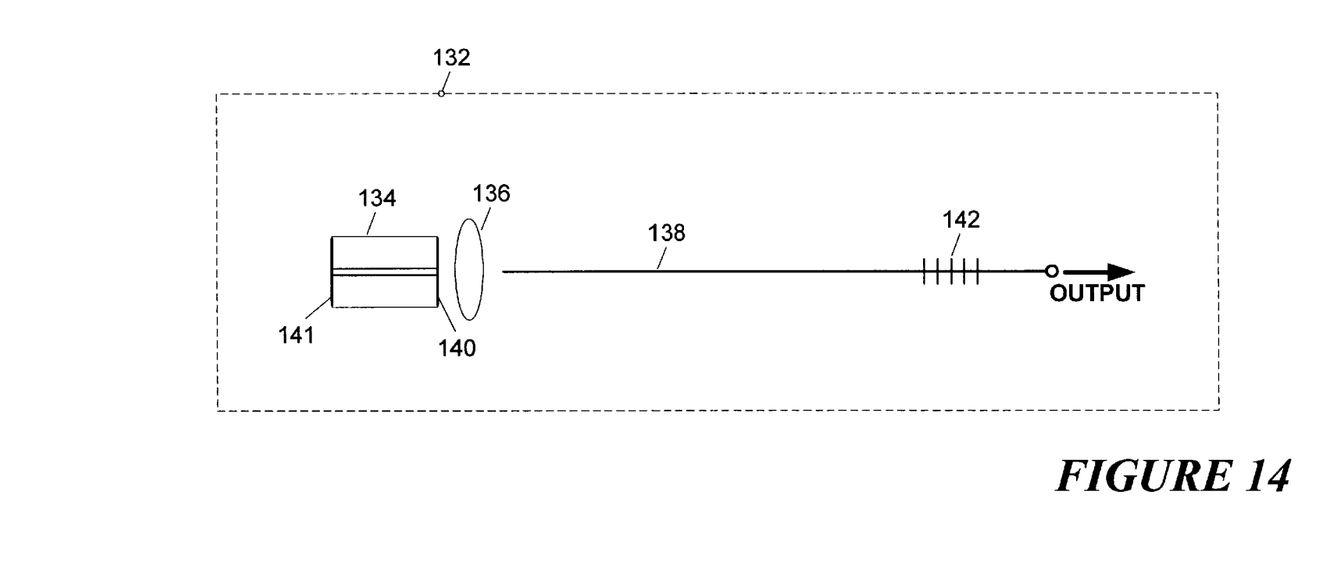
FIG. 14 is a schematic view of an optical source for the embodiment of FIG. 13 in which a semiconductor gain element is used in combination with a wide linewidth grating relatively distant from the gain element.

FIG. 14 shows a first possible embodiment of coherence collapse source 132. A semiconductor gain element 134 is coupled via known coupling optics 136 into optical fiber 138. In the preferred embodiment, the front facet 140 of the gain element 134 has very low reflectivity, and is preferably coated with an anti-reflective coating. In contrast, the rear facet 141 has a very high reflectivity. An optical signal generated in the gain element 134 is coupled into the fiber 138, and encounters grating 142, which is written directly into the fiber. The grating 142 is partially reflective and, for coherence collapse operation, has a relatively low reflectivity. In the preferred embodiment, the reflectivity of grating 142 is less than 10%, and is preferably 2–3%. The grating is constructed to provide a wide linewidth, and is positioned far away from the gain element, so as to set up a long resonator cavity. In a preferred embodiment, for a signal in a wavelength range of 1550 nm, the grating 142 is positioned, e.g., greater than 20 cm from the gain element 134. This separation ensures coherence collapse operation for the source. In one particular version of the FIG. 16 embodiment, the gain element 134 is a Fabry-Perot diode that has a low reflectivity front facet 140 and a high reflectivity rear facet 141.

Figure 15:
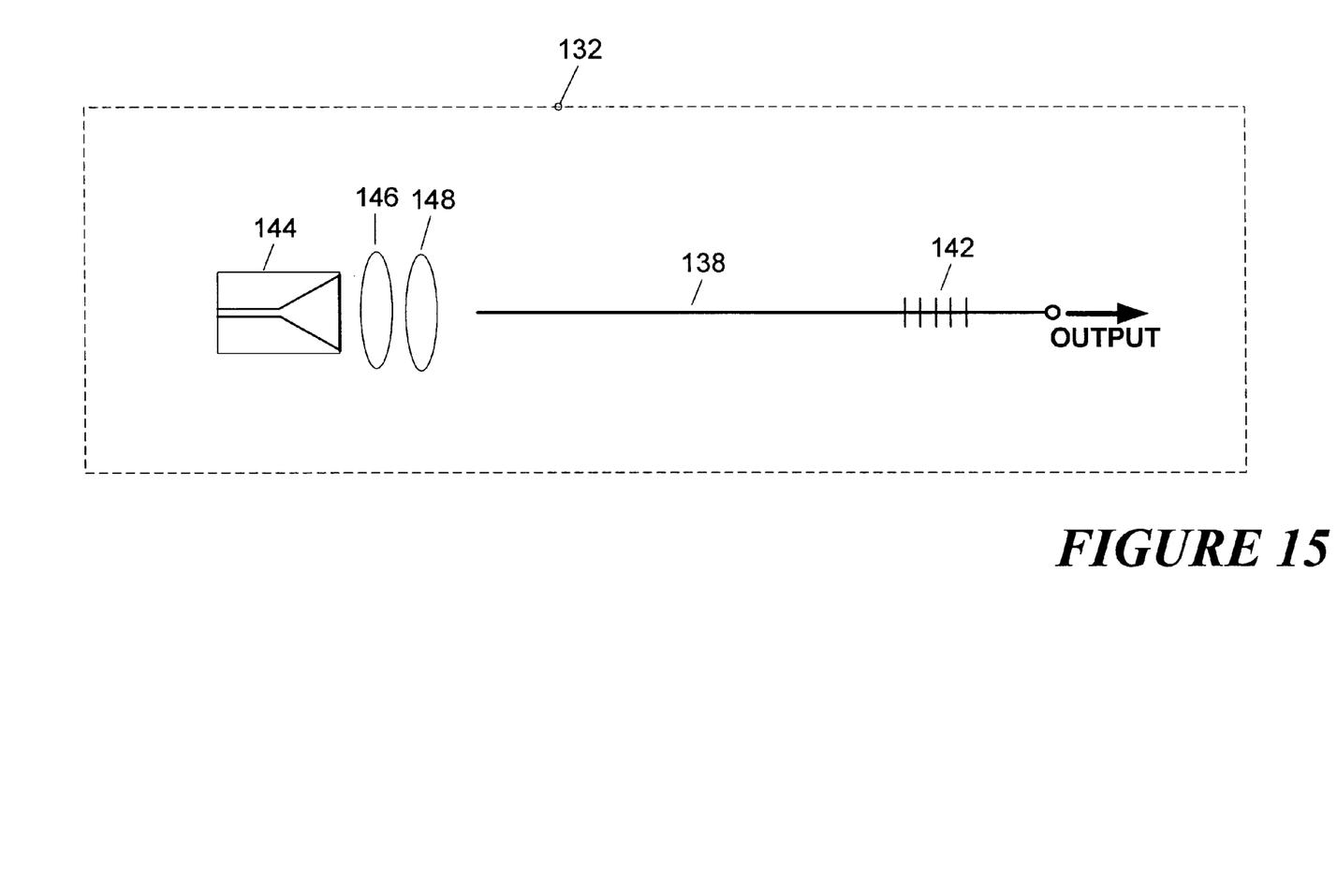
FIG. 15 is a schematic view of an optical source that is an alternative embodiment to that shown in FIG. 14, and that uses a flared diode for generating optical energy.

Another embodiment for the source 132 of FIG. 13 is shown in FIG. 15. This embodiment is similar to that of FIG. 13 in that grating 142 is used with fiber 138. However, a flare diode 144 is used as a light source, and is coupled into the fiber 138 with optical elements 146, 148. These optical elements are, respectively, a cylindrical lens 146 and a spherical lens 148, and are necessary because the output from the flare diode covers a broad area and has a high divergence. The use of the flare diode is beneficial in this embodiment because it allows the use of optical powers that are typically higher than those used in the embodiment of FIG. 14.

Figure 16:
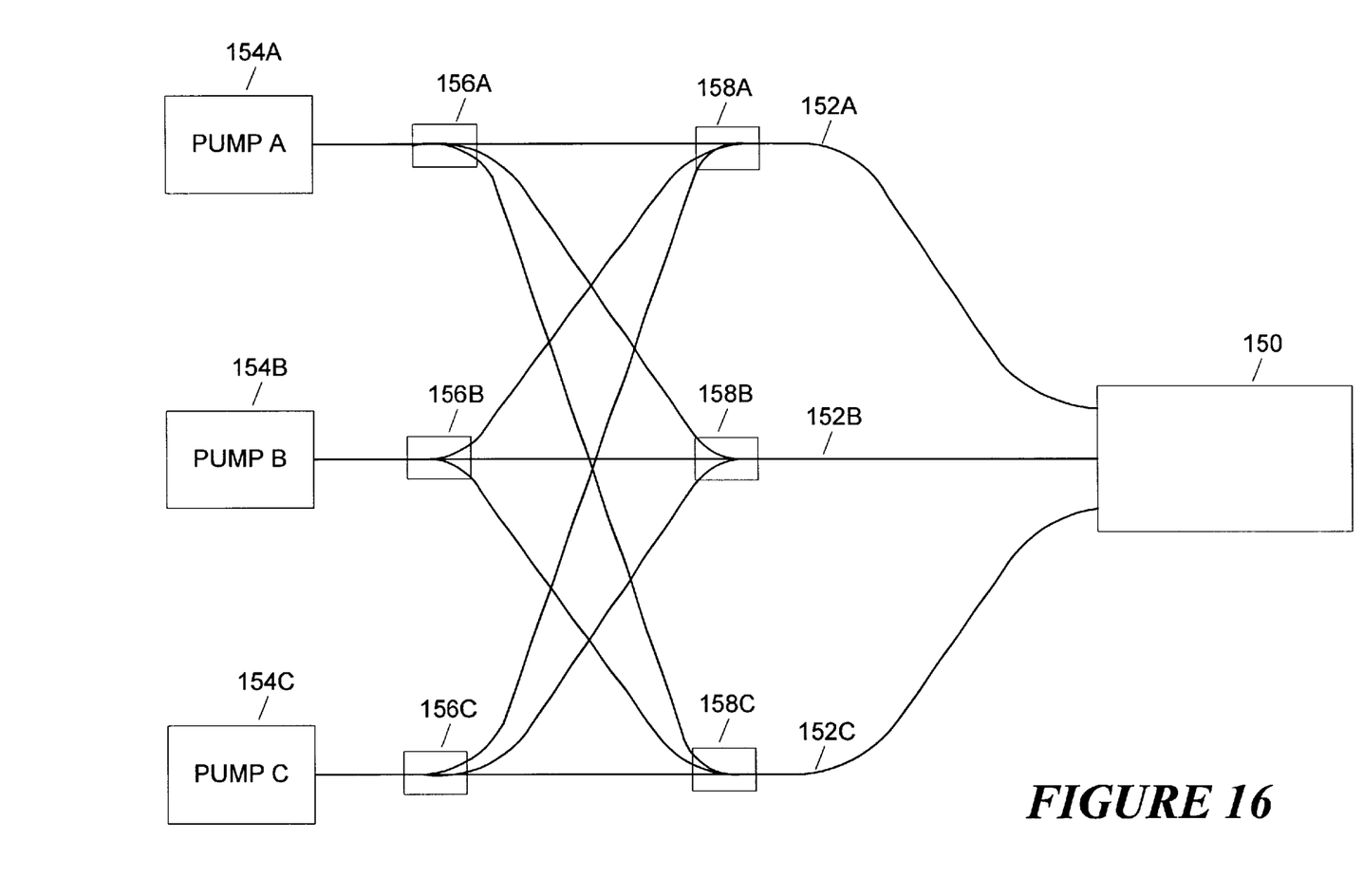
FIG. 16 is a schematic view of a multiple wavelength pumping configuration that provides energy to multiple communications fibers.

Shown in FIG. 16 is a multiple wavelength pumping configuration that provides energy to multiple communications fibers. In the preferred embodiment fibers 152A, 152B, 152C are each part of optical cable 150. Three different communications fibers are described herein for simplicity of description. However, those skilled in the art will recognize that many more fibers would typically be contained in the cable 150, and this embodiment is intended to apply to a situation in which some or all of those many fibers were pumped in the manner described.

Coupled into each of the fibers 152A, 152B, 152C of FIG. 16 are separate pump sources 154A, 154B, 154C, which are labeled in the figure "Pump A," "Pump B" and "Pump C," respectively. In the preferred embodiment, each of these pump sources comprises a CRR configuration, although other types of source may be used as well. Each of the pump sources couples optical energy into each of the fibers for, e.g., pumping for the purposes of Raman gain. Moreover, each of the pump sources has a different output wavelength range. An array of couplers is used to distribute the pumping energy from each of the pumps 154A, 154B, 154C to each of the fibers 152A, 152B, 152C. In the embodiment shown, fused fiber couplers 156A, 156B and 156C are used to couple the pump light out of the fibers from which it originates. Similarly, fused fiber couplers 158A, 158B, 158C are used to couple the pump light back into fibers 152A, 152B, 152C. In this way, pump light from each of the pump sources, and therefore pump light in each of the different pump wavelength ranges, is coupled into each of the fibers.

The embodiment of FIG. 16 provides a system that may be used for more efficient distribution of pump light. The multiple wavelength/broadband pumping of each of the gain media associated with the different fibers provides a wider gain bandwidth for each. Moreover, for high power pump sources, proper distribution may result in more efficient use of the pump light, as saturation in any one of the fibers tends to be avoided. Those skilled in the art will recognize that myriad combinations of parallel fibers and pump sources at different wavelengths are possible using this pumping strategy, and those different combinations are considered to be within the scope of the invention.

While the invention has been shown and described with reference to preferred embodiments thereof, those skilled in the art will recognize that various changes in form and detail may be made herein without departing from the spirit and scope of the invention as defined by the appended claims. For example, in many of the foregoing embodiments, different types of pump sources may be used with different wavelength components. Such pump sources may also be continuous wave or pulsed, as best suited to a particular application. Likewise, different types of fiber, reflective elements, filter components and the like may be substituted for those shown in the preferred embodiments. Indeed, other variations are also possible while still remaining within the scope of the invention.

What is claimed is:

1. An optical signal generator comprising:
   an optical pump source that provides optical pump energy in a predetermined pump wavelength range;
   an optical gain medium that receives the pump energy and generates optical signal energy within an output wavelength range in response thereto;
   a first output coupler via which optical energy at a first wavelength within the output wavelength range is coupled out of the gain medium; and
   a second output coupler via which optical energy at a second wavelength within the output wavelength range and different than the first wavelength is coupled out of the gain medium.

2. An optical signal generator according to claim 1 wherein the first output coupler comprises a first reflector that is partially reflective at the first wavelength and the second output coupler comprises a second reflector that is partially reflective at the second wavelength.

3. An optical signal generator according to claim 1 wherein the gain medium generates optical signal energy via stimulated Raman scattering.

4. An optical signal generator according to claim 1 wherein the signal generator comprises a cascaded Raman resonator (CRR).

5. An optical signal generator according to claim 4 wherein the CRR is a first CRR and the first output coupler is an output coupler for a Stokes wavelength order of the first CRR, and wherein the signal generator further comprises a second CRR and the second output coupler is an output coupler for a Stokes wavelength order of the second CRR.

6. An optical signal generator according to claim 5 wherein the first CRR comprises a plurality of reflectors that are selective at a first plurality of wavelengths corresponding to Stokes wavelength orders of the first CRR, and the second CRR comprises a plurality of reflectors that are selective at a second plurality of wavelengths corresponding to Stokes wavelength orders of the second CRR, said first plurality of wavelengths being substantially different than said second plurality of wavelengths.

7. An optical signal generator according to claim 5 wherein the first CRR and the second CRR both make use of the optical gain medium.

8. An optical signal generator according to claim 5 wherein the first CRR comprises a wavelength tunable reflector.

9. An optical signal generator according to claim 5 wherein the second CRR comprises a wavelength tunable reflector.

10. An optical signal generator according to claim 1 further comprising a filter that attenuates power in the optical energy output from the signal generator at the first wavelength.

11. An optical signal generator according to claim 10 wherein the filter is a first filter and wherein the signal generator comprises a second filter that attenuates power in the optical energy output from the signal generator at the second wavelength.

12. An optical signal generator according to claim 10 wherein the filter comprises a long period grating.

13. An optical signal generator according to claim 1 wherein the first and second output couplers are two of a plurality of output couplers each of which couples optical energy at a different wavelength within the output wavelength range out of the first gain medium.

14. An optical signal generator according to claim 1 wherein the first and second output couplers each comprise a partial reflector that is part of a resonant cavity, the resonant cavity of the first output coupler being resonant at the first wavelength and the resonant cavity of the second output coupler being resonant at the second wavelength.

15. An optical signal generator according to claim 14 wherein the gain medium is a first gain medium and wherein the resonant cavities are located in separate optical paths that include, respectively, second and third gain media.

16. An optical signal generator according to claim 15 where the separate optical paths are both separate from an optical path that contains the gain medium.

17. An optical signal generator according to claim 16 wherein optical energy output via the first and second output couplers is coupled into a common optical path.

18. An optical signal generator according to claim 1 further comprising a reflector that reflects optical energy in the pump wavelength range exiting the gain medium back into the gain medium.

19. An optical signal generator according to claim 1 wherein the optical gain medium is a first optical gain medium and wherein the optical signal generator comprises a second optical gain medium, the optical signal generator including a first resonant cavity for the first wavelength that includes the first optical gain medium and the second optical gain medium, and a second resonant cavity for the second wavelength that includes the first optical gain medium but does not include the second gain medium.

20. An optical signal generator according to claim 19 further comprising a third gain medium, the second resonant cavity including the third gain medium and the first resonant cavity not including the third gain medium.

21. An optical signal generator according to claim 19 further comprising a first cascaded Raman resonator (CRR) and a second CRR, wherein the first output coupler is an output coupler for a Stokes wavelength order of the first CRR, and the second output coupler is an output coupler for a Stokes wavelength order of the second CRR.

22. An optical signal generator according to claim 21 wherein the optical gain medium is a first optical gain medium and wherein the optical signal generator comprises a second optical gain medium, the first CRR including a plurality of resonant cavities that include the first optical gain medium and the second optical gain medium, and the second CRR including a plurality of resonant cavities that include the first optical gain medium but not the second gain medium.

23. An optical signal generator according to claim 22 further comprising a third gain medium, the resonant cavities of the second CRR including the third gain medium and the resonant cavities of the first CRR not including the third gain medium.

24. An optical signal generator according to claim 22 wherein the first CRR comprises a wavelength tunable reflector.

25. An optical signal generator according to claim 24 wherein the second CRR comprises a wavelength tunable reflector.

26. An optical signal generator according to claim 19 wherein the first resonant cavity comprises a first optical signal path and the second resonant cavity comprises a second optical signal path different from the first optical signal path.

27. An optical signal generator according to claim 26 further comprising a third gain medium, wherein the second optical gain medium is located in the first optical signal path and the third optical gain medium is located in the second optical signal path.

28. An optical signal generator according to claim 27 wherein the first optical gain medium is in an optical path that is common to the first resonant cavity and the second resonant cavity.

29. An optical signal generator according to claim 26 wherein the optical pump source is a first optical pump source and wherein the optical signal generator further comprises a second optical pump source the provides pump energy in a second predetermined wavelength range.

30. An optical signal generator according to claim 29 wherein pump energy from the first optical pump source is coupled into the first optical path and pump energy from the second optical pump source is coupled into the second optical path.

31. An optical source according to claim 1 further comprising a wavelength selection attenuation element that provides a predetermined attenuation of wavelengths within the predetermined wavelength range.

32. An optical source according to claim 31 wherein the predetermined attenuation equalizes the power output in different wavelength ranges output by the optical signal generator.

33. An optical signal generator according to claim 32 wherein the gain medium has a predetermined gain wavelength spectrum, and wherein the filter attenuates wavelengths corresponding to known maxima of the gain spectrum.

34. An optical signal generator according to claim 1 wherein the first output coupler has a relatively wide output wavelength band.

35. An optical signal generator according to claim 34 wherein the second output coupler has a relatively wide output wavelength band.

36. An optical signal generator according to claim 34 wherein the first output coupler is a partially reflective reflector and has a reflectivity band greater than 1 nm wide.

37. An optical signal generator according to claim 34 wherein the optical signal generator comprises a cascaded Raman resonator (CRR).

38. An optical signal generator comprising:
   an optical pump source that provides optical pump energy in a predetermined pump wavelength range;
   an optical gain medium that receives the pump energy and generates optical signal energy within an output wavelength range in response thereto, the gain medium comprising a polarization maintaining optical fiber that allows the development of said optical signal energy within the gain medium in multiple distinct polarization modes; and
   resonant reflectors that establish a resonant condition within the signal generator for each of the polarization modes such that each polarization mode may resonate at a different wavelength.

39. An optical signal generator according to claim 38 wherein the reflectors comprise gratings integrated into the optical fiber.

40. An optical signal generator according to claim 38 wherein the optical fiber has a relatively high birefringence.

41. An optical signal generator comprising:
   an optical pump source that provides optical pump energy in a predetermined pump wavelength range;
   an optical gain medium that receives the pump energy and generates optical signal energy within an output wavelength range in response thereto, the gain medium having a predetermined wavelength gain characteristic with maxima within the output wavelength range;
   resonant reflectors that establish a resonant cavity within the signal generator for optical energy within the output wavelength range; and
   an attenuation element located within the resonant cavity that selectively attenuates wavelengths within the output wavelength range so as to reduce the effect of the maxima on the magnitude of portions of a signal output by the signal generator.

42. An optical signal generator according to claim 41 further comprising a plurality of output couplers, each of which couples optical energy within a different output wavelength range out of the resonant cavity.

* * * * *